United States Patent

Mueller et al.

[11] Patent Number: 4,483,239
[45] Date of Patent: Nov. 20, 1984

[54] COOKING GRILL ADAPTER

[76] Inventors: Martin J. Mueller, 4520 Wonder Lake Dr., Wonder Lake, Ill. 60097; Martin Mueller, 4949 E. Lake Shore Dr., Wonder Lake, Ill. 60097

[21] Appl. No.: 451,400

[22] Filed: Dec. 20, 1982

[51] Int. Cl.³ ............................................. A47J 37/06
[52] U.S. Cl. ........................................ 99/340; 99/349; 99/379; 16/375
[58] Field of Search ................. 99/340, 349, 376, 377, 99/379, 380; 248/325, 331; 49/387; 222/309, 391; 16/375

[56] References Cited

U.S. PATENT DOCUMENTS

| | | | |
|---|---|---|---|
| 992,417 | 5/1911 | Gale | 99/379 |
| 1,661,294 | 3/1928 | Lemaster | 99/376 |
| 1,736,784 | 11/1929 | Gloekler | 49/387 X |
| 2,748,690 | 6/1956 | Lipsich et al. | 99/379 X |
| 2,922,357 | 1/1960 | D'Arcey et al. | 99/379 |
| 4,142,654 | 3/1979 | Doubleday et al. | 222/309 |
| 4,165,682 | 8/1979 | Weiss | 99/340 X |

FOREIGN PATENT DOCUMENTS 926031  7/1949  Fed. Rep. of Germany ........ 99/379

Primary Examiner—Billy J. Wilhite
Assistant Examiner—Christine A. Peterson
Attorney, Agent, or Firm—Dressler, Goldsmith, Shore, Sutker & Milnamow

[57] ABSTRACT

An adapter for association with a conventional grill for readily and selectively converting the grill for two-sided cooking of food products. Three different types of adjusting means are provided for varying the spacing between the platen and the grill cooking surface or compensating for warpage of the platen. With such fine adjustments, optimum cooking conditions can be achieved for all types and thicknesses of food products.

14 Claims, 9 Drawing Figures

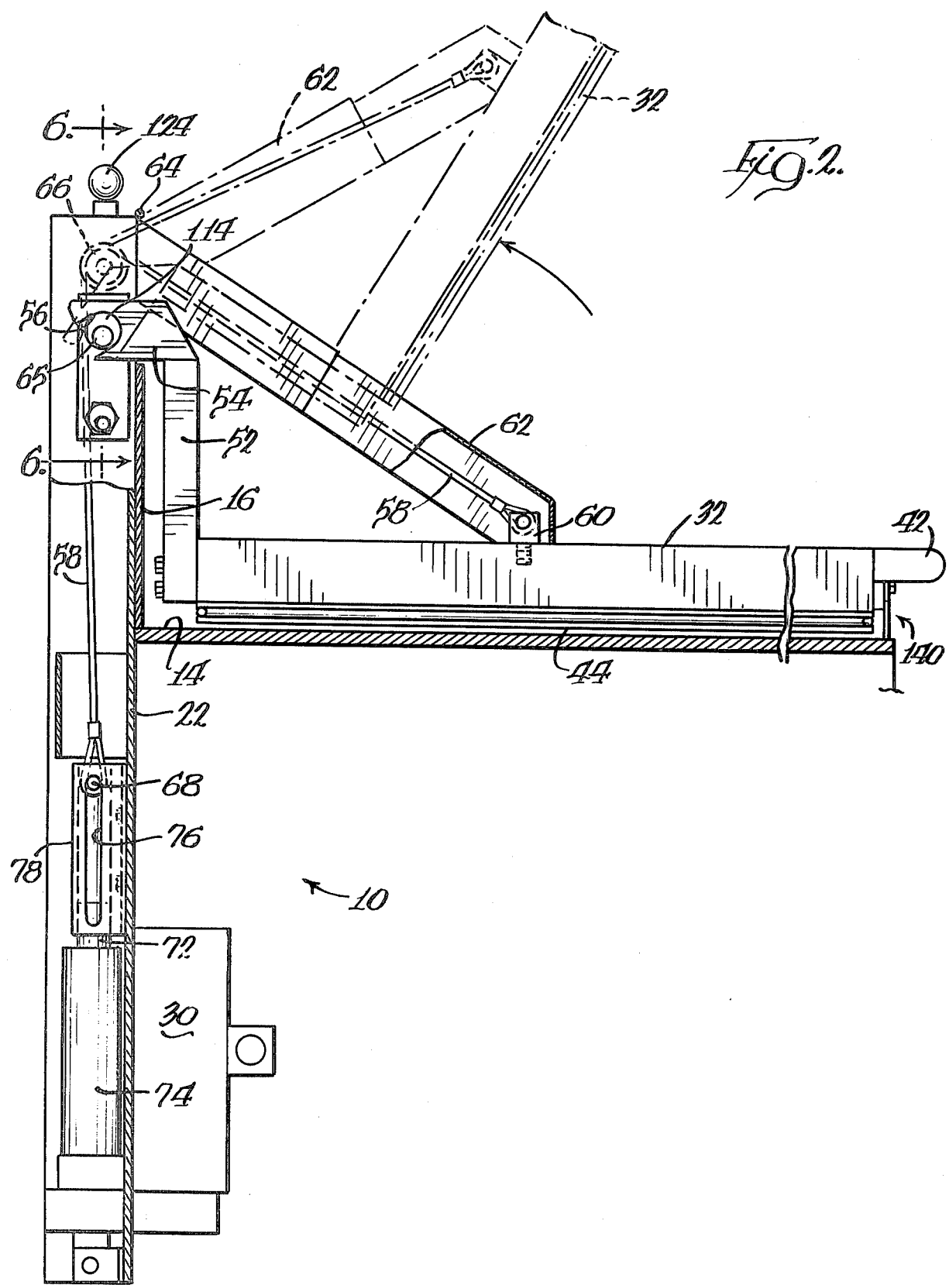

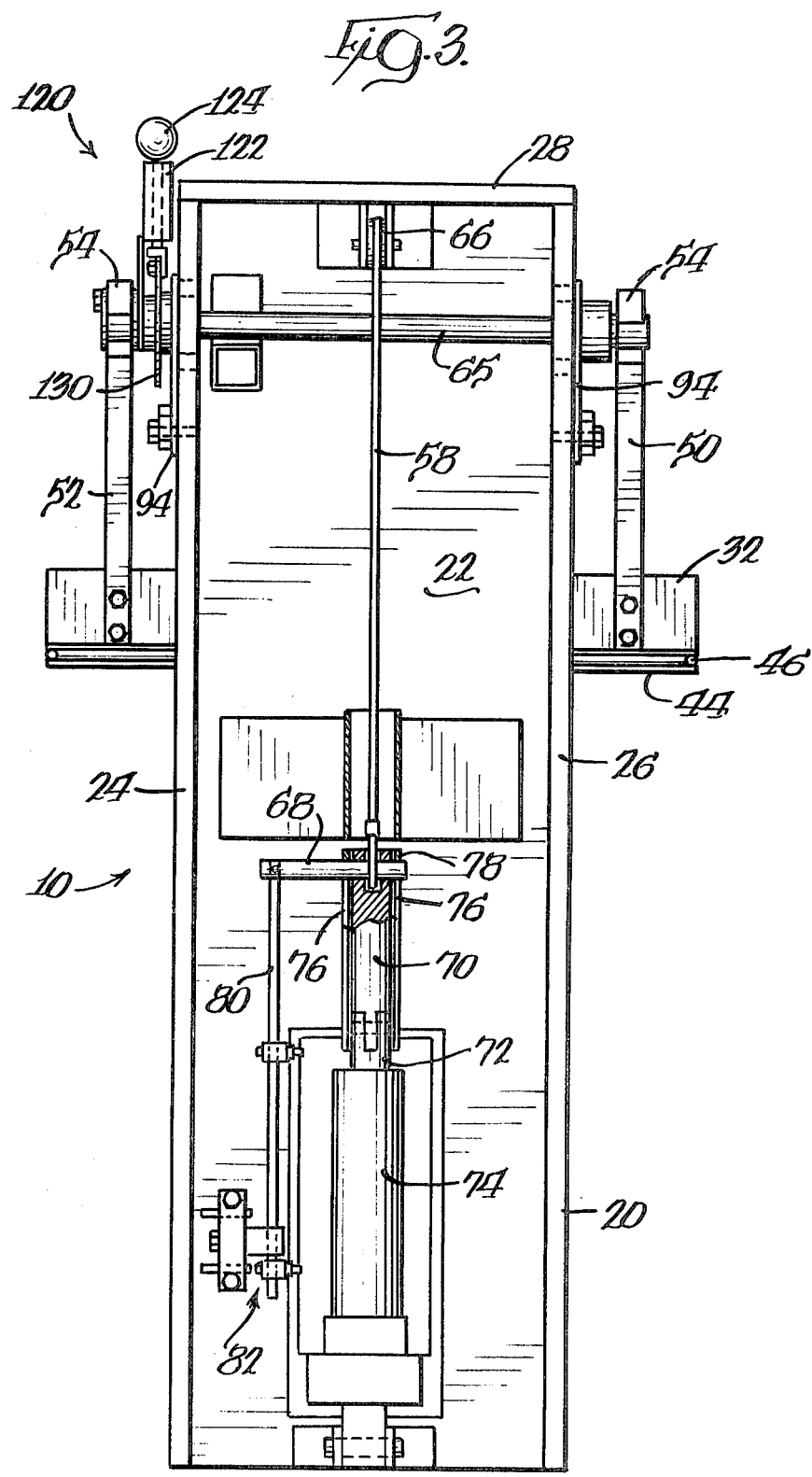

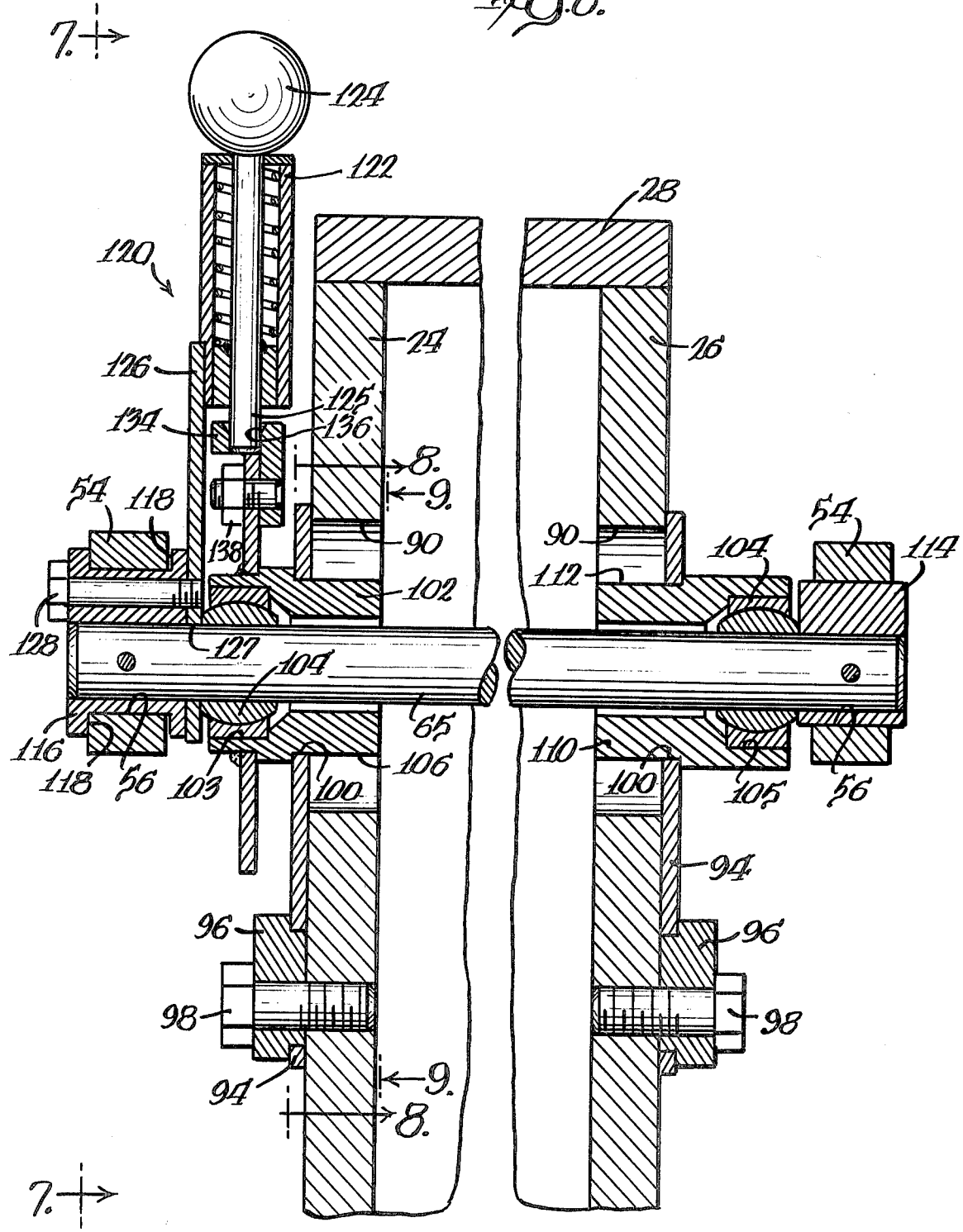

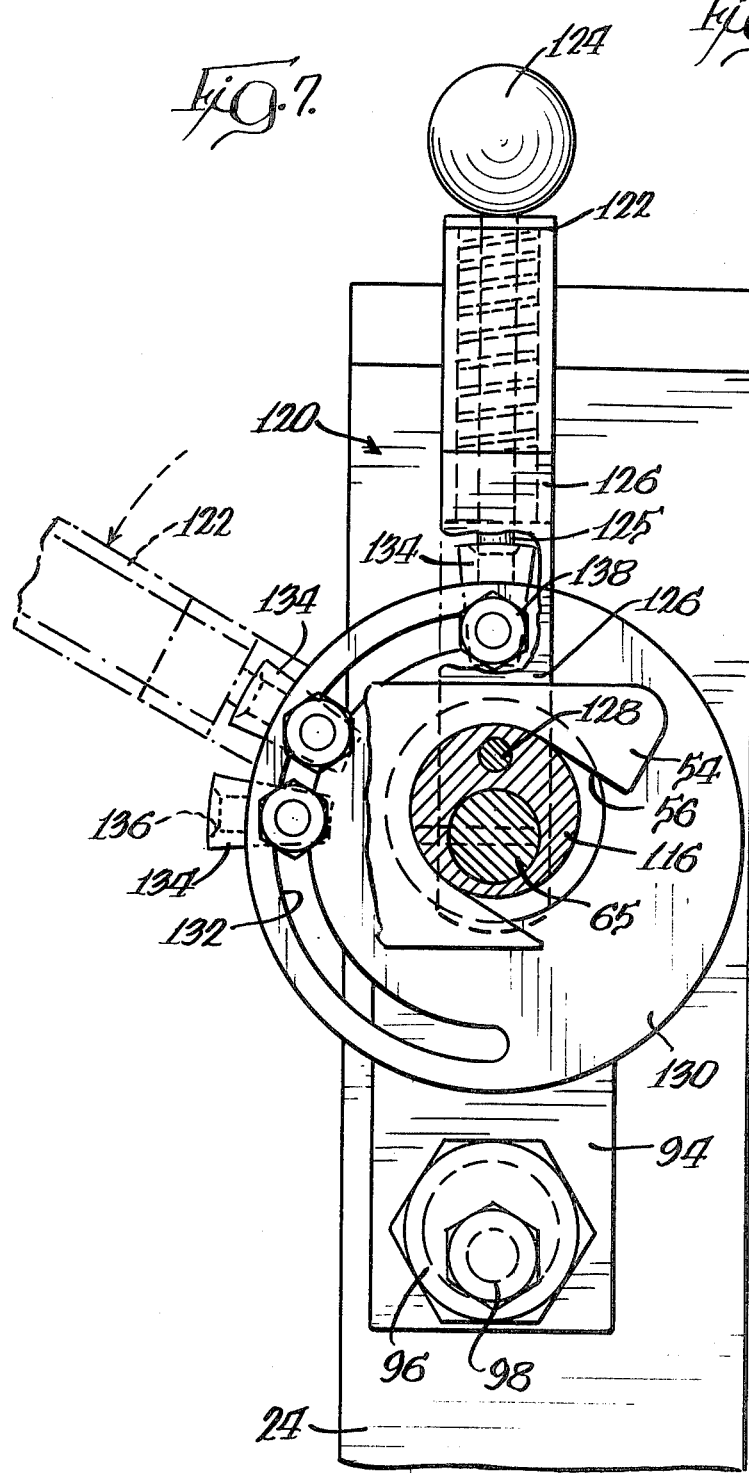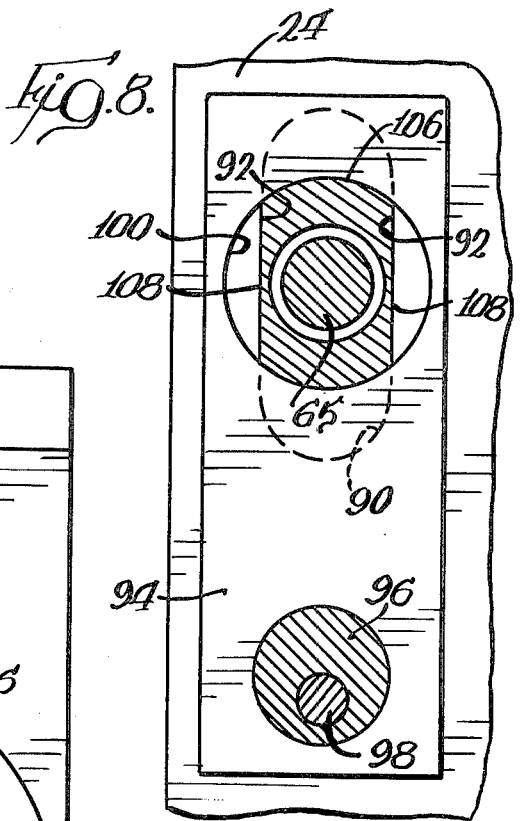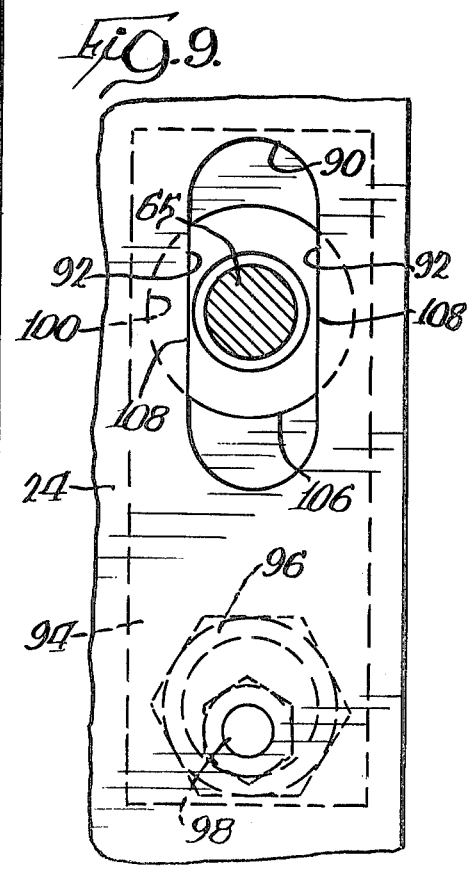

COOKING GRILL ADAPTER

This invention relates to grills for cooking hamburgers and the like in commercial food serving establishments and, more particularly, to an adapter for converting a single-sided cooking grill to one which simultaneously cooks the food product on both sides.

BACKGROUND OF THE INVENTION

When cooking foods, such as hamburgers, steaks, pancakes, or the like, on a grill, commercial food serving establishments strive for two primary objectives; the first being taste and visual appeal, and the second being speed of preparation. The second consideration assumes greater importance, of course, in the so-called fast food establishments. As a result, there have heretofore been provided a veritable plethora of automated and conveyor-fed devices for cooking food products, and especially hamburgers, on both sides at once. Merely represenative of such prior art devices are those shown in U.S. Pat. Nos. 3,646,880 and 3,739,712.

While automated devices of the type alluded to may well have increased output and efficiency of operation, they have also been characterized by numerous problems and disadvantageous features. The most obvious problems related to initial cost and to the difficulty of proper maintenance and upkeep of such intricate and complex machines. Of equal important, perhaps, has been the sacrifice in quality, either real or imagined, of the finished food product. For whatever reasons, the great majority of food establishments still prefer cooking their food products in the old-fashion way, on a stationary grill.

Of course, the cooking of food products on a conventional grill has its own problems and drawbacks. To begin with, the process takes longer and an attendant is required to turn the food products over for cooking on the second side. Those problems can become particularly worrisome when high output is required and a substantial number of products are being cooked at the same time.

Additional problems encountered relate to the effects of heat and cooking on certain food products. For example, it is well known that a hamburger patty shrinks during cooking, the amount of shrinkage depending on a number of factors such as meat content, fat content, cooking temperature and contact with cooking surface. In addition to shrinkage, hamburger patties and other foods have a tendency to curl or shrivel up. Unless restraining pressure is applied directly to the cooking food products, the resulting product can be most visually unappealing. These problems have likewise been recognized by those skilled in the art and efforts have been made to cope with them. For example, U.S. Pat. No. 3,620,156 teaches a toaster device for hamburger buns having biasing means for applying pressure to the toasting buns to compensate for shrinkage and minimize sticking to the cooking platens.

Clearly, there exists a need for a means of improving and increasing the capabilities and efficiency of conventional single-surface cooking grills. More specifically, there exists a need for a means to readily and selectively convert a conventional cooking grill to a double-surface grill.

SUMMARY OF THE INVENTION

The present invention provides an adapter device which may be readily incorporated or attached into a conventional grill for converting that grill to double-surface cooking. The inventive device comprises a cooking platen which can be pivotally associated with a conventional grill for selective positioning into operational or non-operational position.

In general, the invention comprises an upright frame to which the cooking platen is pivotally attached. Novel means is provided for the connection between the platen and frame, said means being selectively adjustable to vary the vertical distance between the grill and platen when the latter is pivoted into the horizontal cooking position over the grill. Additional adjustable means is provided at the front free edge of the platen for fixing the operational vertical distance between the platen and the grill. Still further adjustable means is provided for compensating for warpage of the platen which can occur with continued use. With proper use of all of the adjustable means, it is possible to fix the platen at the most desirable operational cooking position. For example, that platen position can be set for thin, medium or thick hamburgers. At the same time, the platen can apply appropriate pressure to the cooking food products to limit shrinkage and curling thereof and also avoid sticking.

The described various adjustment means are associated with both the rear, pivotally connected portion of the platen and the free, front portion thereof. As a result, it is possible to achieve substantially ideal horizontal orientation of the relatively heavy platen in the cooking position. Uniform cooking of all individual food products in any given batch can thereby be assured.

Other features and advantages of the invention will be apparent from the following description and claims and are illustrated in the accompanying drawings which show structure embodying preferred features of the present invention and the principles thereof.

BRIEF DESCRIPTION OF THE DRAWINGS

FIG. 2 is an enlarged, fragmentary, vertical sectional view taken on the plane of line 2—2 in FIG. 1;

FIG. 3 is a rear elevational view of the inventive adapter alone;

FIG. 6 is a vertical sectional view of the eccentric rear adjustment means taken on the plane of line 6—6 in FIG. 2;

FIG. 7 is a side elevational view taken on the plane of line 7—7 in FIG. 6, with portions broken away for clarity of illustration;

FIG. 8 is a sectional view taken on the plane of line 8—8 in FIG. 6; and

FIG. 9 is a similar view taken on the plane of line 9—9 in FIG. 6.

DETAILED DESCRIPTION OF THE INVENTION

Figure 1:
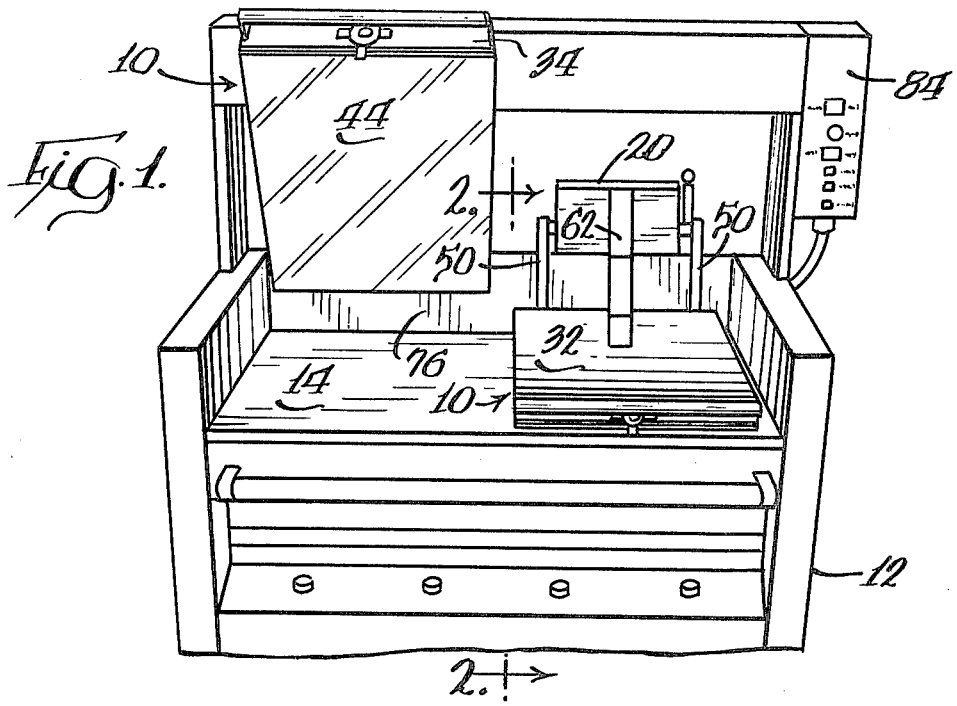
FIG. 1 is a fragmentary front perspective view of two adapters embodying the principles of the invention associated with a conventional grill, showing one of the adapters in the operational cooking position and the other in the upraised non-operational position.

Referring with greater particularity to the various figures of the drawings, the reference character 10 indicates generally a cooking grill adapter embodying the principles of the invention. A pair of adapters 10 is shown associated with a conventional cooking grill 12 having a cooking surface 14 and a splash guard 16. The cooking grill 12 may be either gas or electric fired, and other features thereof are not relevant since the adapter 10 can be attached to any conventional grill.

The adapter 10 comprises a vertical standard or tower 20 (FIG. 3) having a front wall 22, a pair of side walls 24 and 26, and a top wall 28. Mounting means of any suitable type, indicated generally at 30, is provided for connecting the tower 20 to the cooking grill 12. Side-by-side cooking platens 32 are pivotally mounted from the tower 20, and each said cooking platen comprises a heat conducting plate 34 and one or more electrical heating elements 36. Encasing the top of the platen 32 is a top wall 38 having a depending skirt 40 and a front bar handle 42. A skin 44 made of a non-stickable material, such as polytetrafluoroethylene, covers the bottom of the plate 34 and is removably carried thereon by means of a retainer ring 46.

A pair of support arms 50, 50, is rigidly secured to the rear surface of each platen 32 adjacent the lateral edges thereof. The support arms 50 are generally of inverted L-shape, and comprise a vertical leg 52 and a rearwardly extending pivot plate 54 at the top thereof. The pivot plates 54 are each formed with a generally circular recess 56 opening to the lower corner thereof by means of which each platen 32 is pivotally and adjustably mounted from an eccentric shaft 65 carried by the tower 20 in a manner which will subsequently be described in detail.

Platens 32 are further pivotally connected to the tower 20 through a cable 58 connected to a stud 60 centrally positioned on the platen top wall 38. A tubular splash guard 62 encases and protects each cable 58, and said splash guards are hingedly connected at 64 to the top of the tower front wall 22.

A pulley wheel 66 for each platen 32 is carried by the tower 20 adjacent the top thereof, and its respective cable 58 rides thereover behind the front wall 22 of the tower. The lower end of each cable 58 is connected to an actuator pin 68 projecting from a cylinder rod extension 70. Each cylinder rod extension 70 is connected to the rod 72 of a cylinder 74 mounted near the base of the tower 20. The actuator pins 68 ride in the opposed slots 76, 76, of a channel member 78 (see FIGS. 2 and 3), and have depending therefrom a switch rod 80 carrying electrical switches 82. It will thus be noted that the actuator pins 68 are capable of limited vertical movement within the slots 76, whereby the platens 32 can be selectively pivoted from the operational cooking position shown in FIGS. 2 and 3 to the upraised, non-operational position indicated by the phantom lines in FIG. 2. For purposes of operating the cylinders 74 and energizing the cooking platens 32, there is provided appropriate electrical circuitry (not shown) and a control panel 84, including means for automatically raising the platens and de-energizing the same at the end of a pre-set timed cooking cycle.

Turning now to FIGS. 6–9 of the drawings, the means for adjusting the operational position spacing between each of the platens 32 and cooking grill 14 will now be described. Side walls 24 and 26 of the tower 20 are formed with aligned bearing slots 90, said slots being vertically elongate in configuration and having straight parallel side edges 92, 92. A bearing adjustment plate 94 is mounted on each of the side walls 24 and 26 by a headed stub shaft 96 and a threaded bolt 98 positioned eccentrically therethrough. The adjustment plate 94 extends upwardly to cover its associated bearing slot 90 and is formed with a circular bearing opening 100 adjacent its top and in general registry with the slot 90. It will thus be appreciated that the vertical positioning of the bearing opening 100 with relation to its associated bearing slot 90 may be adjusted by rotation of the eccentric stub shaft 96, for reasons which will become apparent.

A first bearing housing 102 is mounted from the tower side wall 24 through its associated opening 100 and slot 90 and carries a bearing 104 in its outer annulus 103. As seen in FIGS. 8 and 9, the bearing housing 102 comprises a reduced diameter inner segment 106 having flat sides 108, 108, so that the housing is captive to the movement of its associated adjustment plate 94 and capable of vertical movement in its associated slot 90. A second bearing housing 110 is similarly mounted from the tower side wall 26 and is generally of the same construction, having a reduced diameter portion 112 with flat sides (not shown) and carries a bearing 104 in its outer annulus 105.

The shaft 65 is rotatably carried by the bearings 104, 104, with end portions thereof extending outwardly beyond said bearings. On the end of the shaft 65 associated with the side wall 26 there is rigidly keyed a cylindrical eccentric 114 which pivotally carries thereon the pivot plate 54 of one of the platen support arms 50. The eccentric 114 serves as a driven or floating eccentric for the platen 32 as will subsequently become apparent.

On the opposite end of the shaft 65 there is rigidly mounted a cylindrical eccentric 116 which serves as a driving or adjusting eccentric in a manner to be described. Eccentric 116 is provided with annular shoulders 118, 118, for retaining on said eccentric the pivot plate 54 of the opposite platen support arm 50.

Manually operable adjusting means 120 is associated with the adjusting eccentric 116. Adjusting means 120 comprises a handle housing 122 having a spring-urged handle 124 with a detent shaft 125 mounted therein. Housing 122 is carried by a drive link 126 rigidly connected to the adjusting eccentric 116 as by a bolt 128. The lower end of link 126 includes a clearance opening 127 which is received over shaft 65.

An adjustment disk 130 is affixed to the first bearing housing 102, as by welding, in substantial alignment with the detent shaft 125. Disk 130 is formed with a circular slot 132 which is adapted to carry therein a plurality of lugs 134 and said lugs have outwardly tapering bores 136 adapted to receive the detent shaft 125. The lugs 134 may be adjustably retained by suitable means such as the nuts 136 whereby they may be pre-set in any desired positions around the perimeter of the disk 130.

Operation of the height adjustment means for the platen 32 may now best be appreciated with reference to FIG. 7. In that figure, the lugs 134 have been pre-set, as an example, for thick hamburger patties, medium patties and thin patties, respectively, proceeding counterclockwise from the top lug. If it is desired to lower the platen for medium thick hamburgers, the handle 124 and detent shaft 125 are withdrawn from the top detent 134, rotated counterclockwise until over the next detent and released, as in the phantom line showing. Such rotation causes rotation of the eccentrically mounted shaft 65, including both eccentrics 114 and 116 carried thereon. Both pivot plates 54 and the platen 32 are thereby lowered to the desired cooking position. Any number of lugs 134 may of course be employed at whatever positions are desired to achieve any degree of fine adjustment.

In situations where warping of the platen 32 has occurred, such out-of-horizontal disfigurement can likewise be compensated for. Thus, a bearing adjustment plate 94 can be moved vertically by its stub shaft 96 to cause vertical movement of that end of the shaft 65 and the portions of the platen 32 supported thereby.

Figure 4:
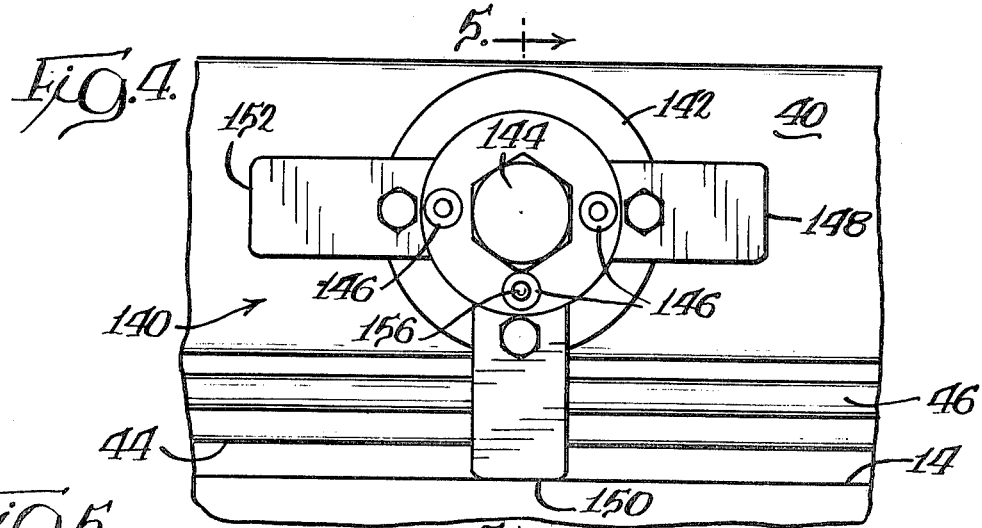
FIG. 4 is an enlarged, front elevational view of the front adjustment means.
Figure 5:
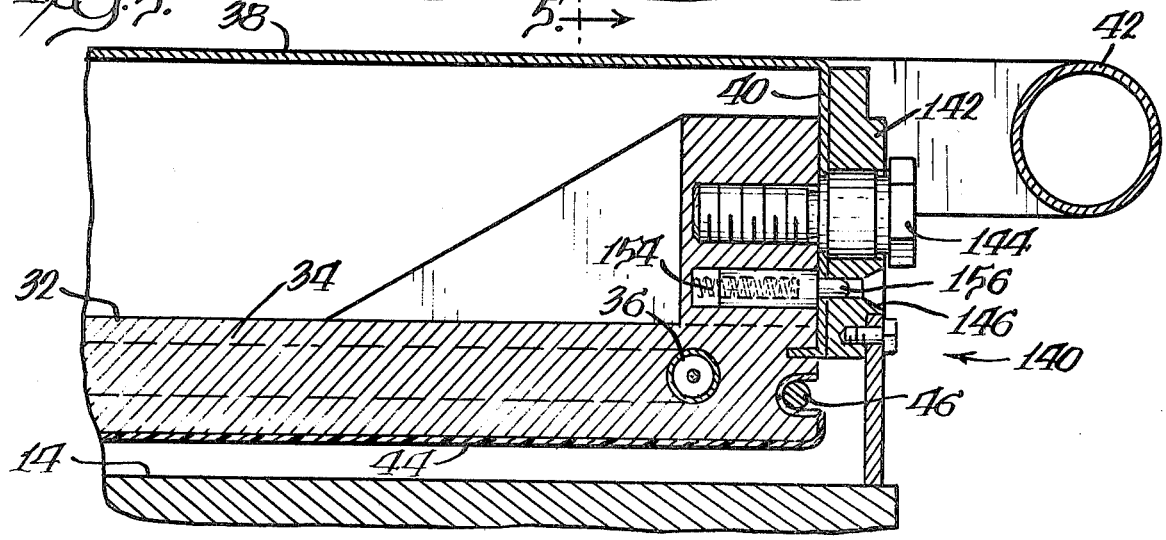
FIG. 5 is a sectional view taken on the plane of line 5—5 in FIG. 4.

The present invention comprises still further platen height adjustment means 140 at the front of platen 32 and best illustrated in FIGS. 4 and 5 of the drawings. Front adjustment means 140 comprises a wheel 142 rotatably connected to the front of the platen skirt 40 at the center thereof with a shouldered screw 144. Wheel 142 is formed with radially spaced lug openings 146 and has removably mounted thereon opposite said openings spacer fingers 148, 150 and 152. As illustrated in FIG. 4, the spacer fingers 148, 150 and 152 are of varying lengths and adapted respectively, for example, for thin hamburger patties, medium patties and thick patties.

To lock the front adjustment means 140 in a desired position, the plate 34 of the platen comprises further a horizontal bore 154 and a spring-urged detent pin 156 projecting through the front of the skirt 40. The detent pin is adapted to be received in any of the lug openings 146. In order to set the front of the platen 32 at a given spacer finger height, it is simply necessary to depress the detent pin 156 with a pointed instrument and rotate the wheel 142 until the detent pin locks the desired spacer finger into the vertical position where it bears against the grill cooking surface 14 forwardly of the cooking area thereon.

The precise manner of using the invention can be varied depending upon the food being cooked and the cooking technique desired. Under normal conditions, the cooking of hamburgers would proceed as follows. Platen height adjusting means 120 and 140 will both be pre-set for thickness of hamburger being cooked. When the platen 32 is lowered into the operational cooking position, it will come to rest, by force of gravity, directly on the raw hamburger patties. In this condition, the pre-selected front spacer finger 148, 150 or 152, will not be in contact with the grill cooking surface 14. As cooking proceeds and the hamburger patties shrink, the platen automatically follows and lowers itself until the spacer finger does abut the grill cooking surface. This desirable floating action is made possible by the rotationally slidable mounting of the pivot plates 54 and their circular recesses 56 on the cylindrical eccentrics 114 and 116.

With the three types of fine adjustments provided by the invention, it will be appreciated that optimum cooking conditions can be achieved under virtually all conditions of use. Uniform cooking of all food products with a minimum of curling and sticking to the platen can thus be assured. Since the front adjustment provided by fingers 148, 150 and 152 is provided forwardly of the normal cooking area on surface 14, and since the rear and warpage adjustment means are completely removed from the cooking surface, accurate adjustment of the platens 32 can be accomplished and will not be hindered by an accumulation of meat residue, grease and other debris normally created by the cooking of hamburgers and the like. Of course, when it is desired to use the grill for one-sided cooking, it is simply necessary to pivot the adapter into the upraised non-operational position.

Various modifications are contemplated and may obviously be resorted to by those skilled in the art without departing from the spirit and scope of the invention, as hereinafter defined by the appended claims, as only a preferred embodiment has been disclosed.

What is claimed is:

1. An adapter for converting a grill having a horizontally oriented cooking surface for two-sided cooking comprising:
    a vertically oriented support standard;
    a cooking platen;
    mounting means connecting said platen to said standard for pivotal movement between a non-operational upraised position and an operational position above and in substantial parallelism with said cooking surface, said mounting means comprising a horizontally oriented shaft in said standard and a support arm projecting upwardly from said platen, said support arm being pivotally carried on said shaft; and
    adjusting means for selectively varying the distance between said platen and cooking surface when the platen is in the operational position, said adjusting means comprising an eccentric fixedly mounted on said shaft, said support arm being pivotally carried by said eccentric.

2. An adapter according to claim 1 wherein said adjusting means comprises further handle means connected to said eccentric for manually rotating said eccentric and cooperating positioning means for selectively locking said handle means in any of a plurality of positions.

3. An adapter according to claim 2 wherein said handle means comprises a drive link secured to said eccentric, a housing carried by said drive link, and a spring-loaded handle having a detent shaft carried in said housing, and said positioning means comprising a plurality of radially oriented lugs adapted to receive said detent shaft therein.

4. An adapter according to claim 2 wherein there are a pair of said support arms rigidly connected to a rear surface of said platen adjacent the opposite ends of said surface, and a pair of said eccentrics fixedly mounted on the opposite ends of said shaft, said support arms being pivotally carried by said eccentrics whereby rotation of said handle means causes simultaneous rotation of both of said eccentrics and vertical movement of said shaft.

5. An adapter according to claim 4 and comprising further second adjusting means associated with said shaft for selectively moving vertically either end of said shaft.

6. An adapter according to claim 5 wherein said second adjusting means comprises a vertical plate mounted on each of the lateral sides of said standard, each of said plates being formed with an opening accommodating said shaft therethrough, and locking means for releasably locking each of said plates in a selected position.

7. An adapter for converting a grill having a horizontally oriented cooking surface for two-sided cooking comprising:
    a framework attachable to the grill to provide a vertically oriented support tower at the rear thereof, said tower comprising a front wall and a pair of side walls;

a cooking platen having front, rear and top walls and a bottom platen face;

a pair of support arms connected to the rear wall of said platen adjacent opposite ends thereof and extending normally from said platen, each of said support arms comprising a top mounting plate extending rearwardly therefrom;

a horizontally oriented shaft mounted in said tower and projecting through said side walls thereof;

a cylindrical eccentric fixedly mounted on each projecting end of said shaft;

said mounting plates being pivotally mounted on said eccentrics whereby said platen can be pivoted between a non-operational upraised position and an operational position above and in substantial parallelism with said cooking surface;

and means for rotating and retaining said shaft and eccentrics in a plurality of vertical positions whereby the vertical spacing between said cooking surface and the platen in the operational position can be adjusted.

8. An adapter according to claim 7 wherein said means comprises a drive link rigidly connected to one of said eccentrics, a spring-urged detent handle carried by said drive link, and lug means for receiving said detent handle in any of a plurality of positions.

9. An adapter according to claim 8 and comprising further a vertical disk rigidly mounted on said shaft in association with said one eccentric, said disk being formed with an arcuate slot therein, and a plurality of detent receiving lugs adjustably carried through said slot.

10. An adapter according to claim 9 and comprising further front adjusting means mounted on the front wall of said platen, said front adjusting means comprising a wheel rotatably mounted on said platen front wall, a plurality of radially spaced lug openings formed in said wheel, spring-urged detent means carried by said platen front wall and adapted to cooperate with said lug openings, and a plurality of varying length fingers mounted on said wheel, one opposite each of said lug openings, and adapted to bear against said cooking surface to adjust the spacing between the cooking surface and platen in the operational position.

11. An adapter according to claim 10 and comprising further a cable connected to a stud on the top wall of said platen, a pulley carried by said tower and carrying said cable thereover to the rear of said tower, an electrically operated cylinder having a ram and mounted at the rear of said tower, and said cable being connected to the ram of said cylinder for pivoting said platen between the non-operational and operational positions.

12. An adapter according to claim 11 and comprising further additional adjusting means mounted on said tower for independently adjusting the vertical positioning of either end of said shaft.

13. An adapter according to claim 12 wherein said further additional adjusting means comprises:

vertically oriented slots formed in said tower side walls;

bearing housings having complementary flat sides slidably mounted in said slots, said bearing housings carrying said shaft therethrough;

an adjusting plate slidably mounted on each of said tower side walls and having an opening in registry with said slots and accommodating said bearing housings therethrough; and eccentric connector means mounting said plates to said tower side walls whereby vertical movement of either of said plates causes vertical movement of the associated bearing housing and shaft end.

14. An adapter according to claim 7 wherein each of said mounting plates comprises a generally circular recess opening to a lower corner thereof, said recesses slidably receiving said eccentrics therein whereby said cooking platen is adapted to float downwardly as cooking food products therebeneath shrink during cooking.

* * * * *